US012797980B2

(12) United States Patent
Pechstein et al.

(10) Patent No.: US 12,797,980 B2
(45) Date of Patent: Nov. 17, 2026

(54) LUBRICATION SYSTEM FOR PORTABLE PIPE THREADER

(71) Applicant: MILWAUKEE ELECTRIC TOOL CORPORATION, Brookfield, WI (US)

(72) Inventors: Joseph J. Pechstein, West Bend, WI (US); Sean T. Kehoe, Hartland, WI (US); Aaron Grode, Brookfield, WI (US); Timothy Hilger, Waterford, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 476 days.

(21) Appl. No.: 17/710,108

(22) Filed: Mar. 31, 2022

(65) Prior Publication Data

US 2022/0314351 A1 Oct. 6, 2022

Related U.S. Application Data

(60) Provisional application No. 63/218,653, filed on Jul. 6, 2021, provisional application No. 63/168,741, filed on Mar. 31, 2021.

(51) Int. Cl.
*B23G 1/24* (2006.01)
*B23G 1/52* (2006.01)

(52) U.S. Cl.
CPC ................. *B23G 1/24* (2013.01); *B23G 1/52* (2013.01); *B23G 2240/12* (2013.01); *B23G 2240/40* (2013.01); *Y10T 82/22* (2015.01)

(58) Field of Classification Search
CPC .. B23G 1/24; B23G 2240/12; B23G 2240/40; B23G 1/22; B23G 1/225; B23G 1/52; B23Q 11/1092; B23Q 11/10; Y10T 82/22
(Continued)

(56) References Cited

U.S. PATENT DOCUMENTS 1,527,185 A 2/1925 Hall
1,672,583 A 6/1928 Travers
(Continued)

FOREIGN PATENT DOCUMENTS

CN 101704141 A 5/2010
CN 101758305 A 6/2010
(Continued)

OTHER PUBLICATIONS

International Search Report and Written Opinion for Application No. PCT/US2022/022805 dated Jul. 22, 2022 (10 pages).
(Continued)

*Primary Examiner* — Sunil K Singh
*Assistant Examiner* — Michael Vitale
(74) *Attorney, Agent, or Firm* — Michael Best & Friedrich LLP

(57) ABSTRACT

A portable pipe threader includes a housing, a carriage supported by the housing, at least one pipe threading tool coupled to the carriage and selectively operable to perform work on a pipe, a drive assembly at least partially positioned within the housing including an electric motor operable to provide torque to the pipe, and a lubrication system removably coupled to the housing, the lubrication system including a reservoir for holding a lubricant and a pump supported upon the reservoir and configured to draw the lubricant from the reservoir, the pump being powered by the drive assembly.

19 Claims, 10 Drawing Sheets

(58) Field of Classification Search
USPC .......................................... 470/66–83; 82/113
See application file for complete search history.

(56) References Cited

U.S. PATENT DOCUMENTS

| | | | | |
|---|---|---|---|---|
| 1,831,957 | A | | 11/1931 | Harrison |
| 1,956,182 | A | | 4/1934 | Thewes |
| 1,966,124 | A | | 7/1934 | Kimlin et al. |
| 1,973,231 | A | | 9/1934 | Thewes |
| 2,004,639 | A | | 6/1935 | Thewes |
| 2,076,831 | A | | 4/1937 | Thewes |
| 2,110,099 | A | | 3/1938 | Thewes |
| 2,205,148 | A | | 6/1940 | Mayotte |
| 2,219,721 | A | | 10/1940 | Ingwer et al. |
| 2,242,954 | A | | 5/1941 | Ingwer |
| 2,255,009 | A | | 9/1941 | Ingwer |
| 2,304,027 | A | | 12/1942 | Sellmeyer |
| 2,350,313 | A | | 5/1944 | Ingwer et al. |
| 2,374,176 | A | | 4/1945 | Cook |
| 2,393,498 | A | | 1/1946 | Miller |
| 2,581,702 | A | | 1/1952 | Quijada |
| 2,591,389 | A | | 4/1952 | Wallace |
| 2,600,776 | A | | 6/1952 | Ingwer |
| 2,678,453 | A | | 5/1954 | Rudolph |
| 2,680,256 | A | | 6/1954 | Ingwer et al. |
| 2,680,861 | A | | 6/1954 | Ingwer et al. |
| 2,693,966 | A | | 11/1954 | Chasar |
| 2,745,670 | A | | 5/1956 | Janik |
| 2,753,575 | A | | 7/1956 | Ingwer |
| 2,768,550 | A | | 10/1956 | Ingwer et al. |
| 2,778,652 | A | | 1/1957 | Ingwer et al. |
| 2,891,799 | A | | 6/1959 | Janik |
| 2,916,749 | A | | 12/1959 | Ingwer et al. |
| 2,996,737 | A | | 8/1961 | Bjalme |
| 3,002,205 | A | | 10/1961 | Buyer |
| 3,009,178 | A | | 11/1961 | Buyer |
| 3,012,792 | A | | 12/1961 | Bjalme |
| 3,049,737 | A | | 8/1962 | Weibel |
| 3,082,445 | A | | 3/1963 | Buyer |
| 3,095,772 | A | | 7/1963 | Ingwer |
| 3,188,666 | A | | 6/1965 | Brown, Sr. et al. |
| 3,232,629 | A | | 2/1966 | Obear |
| 3,270,592 | A | | 9/1966 | Behnke |
| 3,316,571 | A | | 5/1967 | Cutrone |
| 3,332,095 | A | * | 7/1967 | Ivester ..................... B23G 1/22 470/209 |
| 3,371,258 | A | | 2/1968 | Brown |
| 3,398,966 | A | | 8/1968 | Chalfant et al. |
| 3,413,667 | A | | 12/1968 | Behnke |
| 3,427,672 | A | | 2/1969 | Frank |
| 3,456,956 | A | | 7/1969 | Herbkersman |
| 3,521,313 | A | | 7/1970 | Baker |
| 3,526,411 | A | | 9/1970 | Chalfant et al. |
| 3,562,827 | A | | 2/1971 | Janik |
| 3,610,640 | A | | 10/1971 | Bollin et al. |
| 3,631,552 | A | | 1/1972 | Ivester |
| 3,811,145 | A | | 5/1974 | Fink |
| 3,864,774 | A | | 2/1975 | Fohl |
| 3,995,869 | A | | 12/1976 | Mazingue |
| 4,002,960 | A | | 1/1977 | Brookfield et al. |
| 4,109,831 | A | * | 8/1978 | Culpepper ......... F01M 11/0458 222/254 |
| 4,209,274 | A | | 6/1980 | Martin et al. |
| 4,213,722 | A | | 7/1980 | Wagner |
| 4,225,273 | A | | 9/1980 | Womack |
| 4,247,124 | A | | 1/1981 | Wagner |
| 4,275,490 | A | | 6/1981 | Bivins |
| 4,276,490 | A | | 6/1981 | Saldinger |
| 4,279,182 | A | | 7/1981 | Miyagawa et al. |
| 4,338,556 | A | | 7/1982 | Hetzel |
| 4,370,770 | A | | 2/1983 | Wagner |
| 4,402,423 | A | | 9/1983 | Skowronski et al. |
| 4,581,783 | A | | 4/1986 | Hayes et al. |
| 4,606,249 | A | | 8/1986 | Hayes et al. |
| 4,613,260 | A | | 9/1986 | Hayes et al. |
| 4,692,071 | A | | 9/1987 | Hirota |
| 4,752,163 | A | | 6/1988 | Fedor |
| 4,757,598 | A | | 7/1988 | Redman |
| 4,787,531 | A | | 11/1988 | Gress |
| D299,466 | S | | 1/1989 | Hayes et al. |
| 4,795,175 | A | | 1/1989 | Babb et al. |
| 4,808,047 | A | | 2/1989 | Calevich et al. |
| 4,811,639 | A | | 3/1989 | Gress et al. |
| 4,819,527 | A | | 4/1989 | Redman |
| 5,002,440 | A | | 3/1991 | Tamaoki et al. |
| 5,074,176 | A | | 12/1991 | Redman et al. |
| 5,076,744 | A | | 12/1991 | Kitagawa et al. |
| 5,087,013 | A | | 2/1992 | Gress et al. |
| 5,104,268 | A | | 4/1992 | Kitagawa et al. |
| 5,158,404 | A | | 10/1992 | Samas et al. |
| 5,199,928 | A | | 4/1993 | Gress et al. |
| 5,458,770 | A | | 10/1995 | Fentz |
| 5,560,582 | A | | 10/1996 | Beelen |
| 5,700,140 | A | * | 12/1997 | Gray ....................... F04C 14/26 418/104 |
| 5,826,469 | A | | 10/1998 | Harademn |
| 5,890,852 | A | | 4/1999 | Gress |
| 6,439,087 | B1 | | 8/2002 | Haas |
| 6,471,220 | B1 | | 10/2002 | Babb |
| 7,854,321 | B2 | | 12/2010 | Twig et al. |
| 7,958,805 | B2 | | 6/2011 | Rigolone et al. |
| 8,047,923 | B2 | | 11/2011 | Emerson |
| 9,095,917 | B2 | | 8/2015 | Patil et al. |
| 9,138,818 | B2 | | 9/2015 | Kundracik et al. |
| 9,370,835 | B2 | | 6/2016 | Kundracik et al. |
| 9,796,033 | B2 | | 10/2017 | Kundracik et al. |
| 10,016,830 | B2 | | 7/2018 | Hamm et al. |
| 10,239,140 | B2 | | 3/2019 | Kundracik et al. |
| 10,668,548 | B2 | | 6/2020 | Kundracik et al. |
| 2003/0024357 | A1 | | 2/2003 | Hofmann et al. |
| 2007/0137934 | A1 | * | 6/2007 | Nappier ............. B23Q 11/1092 184/6.14 |
| 2008/0210062 | A1 | | 9/2008 | Nitchman et al. |
| 2008/0277335 | A1 | | 11/2008 | Allen |
| 2009/0248188 | A1 | | 10/2009 | Haas et al. |
| 2011/0217196 | A1 | | 9/2011 | Gang |
| 2013/0055862 | A1 | | 3/2013 | Kundracik et al. |
| 2015/0165534 | A1 | | 6/2015 | Hamm |
| 2016/0256943 | A1 | * | 9/2016 | Kundracik ............... B23G 1/52 |
| 2017/0100791 | A1 | | 4/2017 | Hamm et al. |
| 2017/0259357 | A1 | | 9/2017 | Choi |
| 2018/0147713 | A1 | | 5/2018 | Schmauder et al. |
| 2019/0006980 | A1 | | 1/2019 | Sheeks et al. |
| 2019/0044110 | A1 | | 2/2019 | Sheeks et al. |
| 2019/0143430 | A1 | | 5/2019 | Kundracik et al. |
| 2021/0129228 | A1 | | 5/2021 | Pechstein et al. |
| 2021/0229200 | A1 | | 7/2021 | Pechstein et al. |

FOREIGN PATENT DOCUMENTS

| | | | |
|---|---|---|---|
| CN | 102513618 | B | 9/2014 |
| CN | 204035722 | U | 12/2014 |
| CN | 104942382 | A | 9/2015 |
| CN | 204770999 | U | 11/2015 |
| CN | 105171145 | A | 12/2015 |
| CN | 104588792 | B | 2/2017 |
| CN | 206084041 | U | 4/2017 |
| CN | 107378015 | A | 11/2017 |
| CN | 107511539 | A | 12/2017 |
| CN | 208067512 | U | 11/2018 |
| CN | 109773283 | A | 5/2019 |
| CN | 209094723 | U | 7/2019 |
| CN | 206509598 | U | 9/2019 |
| CN | 109226911 | B | 2/2020 |
| DE | 1527169 | A1 | 7/1969 |
| DE | 1527175 | B1 | 12/1970 |
| DE | 20016924 | U1 | 12/2000 |
| EP | 0249184 | B1 | 2/1993 |
| EP | 0569320 | A1 | 11/1993 |
| EP | 1524058 | A2 | 4/2005 |
| EP | 1907172 | B1 | 5/2015 |
| EP | 2605879 | B1 | 8/2019 |
| EP | 3584027 | B1 | 7/2020 |
| JP | 2005161515 | A | 6/2005 |

(56) References Cited

FOREIGN PATENT DOCUMENTS

| | | | |
|---|---|---|---|
| JP | 2019048371 | A | 3/2019 |
| WO | 2010018409 | A2 | 2/2010 |
| WO | 2019006452 | A2 | 1/2019 |

OTHER PUBLICATIONS

Ridgid Tools, “Model 535A Automatic Threading Machine,” <https://www.ridgid.com/US/en/535a-automatic-threading-machine> web page publicly available at least as early as Nov. 1, 2020.
Teledyne Oster, “Power Threaders,” Catalog No. 77, Copyright 1976 (28 pages).
Wheeler Mfg., “Universal Dies/Die Heads are suited for in-place threading,” <https://news.thomasnet.com/fullstory/universal-dies-die-heads-are-suited-for-in-place-threading-29007> press release dated Dec. 12, 2003.

* cited by examiner

LUBRICATION SYSTEM FOR PORTABLE PIPE THREADER

CROSS-REFERENCE TO RELATED APPLICATIONS

This application claims priority to U.S. Provisional Patent Application No. 63/218,653 filed on Jul. 6, 2021, and U.S. Provisional Patent Application No. 63/168,741 filed on Mar. 31, 2021, the entire contents of both of which are incorporated herein by reference.

FIELD OF THE INVENTION

The present invention relates to pipe threaders, and more particularly to lubrication systems for portable pipe threaders.

BACKGROUND OF THE INVENTION

Portable pipe threaders include a stand and a carriage mounted to the stand having multiple pipe threading tools. These tools are usually a die holder including a die, a pipe cutter, and a pipe reamer. Typically, a motor transmits torque to a chuck. A pipe is clamped within the chuck and as the motor rotates the chuck, the pipe rotates with respect to the tools. The motor is an AC motor that receives power from a remote power source (e.g., via a power cord) and is usually controlled using a pedal, which upon actuation, triggers the motor to begin rotating the chuck and the pipe therein to cut the pipe, thread the pipe, etc. During threading operations, the thread-cutting dies, or other pipe threading tools, require lubrication to minimize friction and prevent excessive heat on the pipe and the tool. Some portable pipe threaders have an onboard lubrication system to lubricate the dies as the threads are being cut on the pipe, while others rely upon the operator to manually lubricate the dies with a hand-operated pump.

SUMMARY OF THE INVENTION

The present invention provides, in one aspect, a portable pipe threader including a housing, a carriage supported by the housing, at least one pipe threading tool coupled to the carriage and selectively operable to perform work on a pipe, a drive assembly at least partially positioned within the housing and including an electric motor operable to provide torque to the pipe, and a lubrication system removably coupled to the housing, the lubrication system including a reservoir for holding a lubricant and a pump supported upon the reservoir and configured to draw the lubricant from the reservoir, the pump being powered by the drive assembly.

The present invention provides, in another aspect, a portable pipe threader including a housing, a carriage supported by the housing, at least one pipe threading tool coupled to the carriage and selectively operable to perform work on a pipe, a drive assembly at least partially positioned within the housing and including an electric motor operable to provide torque to the pipe, and a lubrication system including a reservoir coupled to the housing. The lubrication system further includes a valve positioned within an inlet of the reservoir, and a basin positioned beneath the carriage having an inclined bottom wall for directing lubricant toward the reservoir when the valve is actuated from an open position, in which lubricant may flow through the reservoir inlet and into the reservoir, and a closed position, in which lubricant is prevented from exiting the reservoir through the reservoir inlet, in response to removal of the reservoir from the basin.

The present invention provides, in yet another aspect, a portable pipe threader including a housing, a carriage supported by the housing, at least one pipe threading tool coupled to the carriage and selectively operable to perform work on a pipe, a drive assembly at least partially positioned within the housing and including an electric motor operable to provide torque to the pipe, and a lubrication system removably coupled to the housing, the lubrication system including a reservoir for holding a lubricant and a pump powered by the drive assembly. The portable pipe threader further includes a stand adjustable between a collapsed state and a deployed state, and, when in the collapsed state a longitudinal axis of the housing is maintained at a first oblique angle relative to a horizontal reference plane parallel with a work surface upon which the stand is supported to funnel lubricant toward the reservoir and in the deployed state the longitudinal axis of the housing is maintained at a second oblique angle relative to the horizontal reference plane parallel with the work surface upon which the stand is supported to funnel lubricant away from an end of the pipe on which a working operation is performed.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
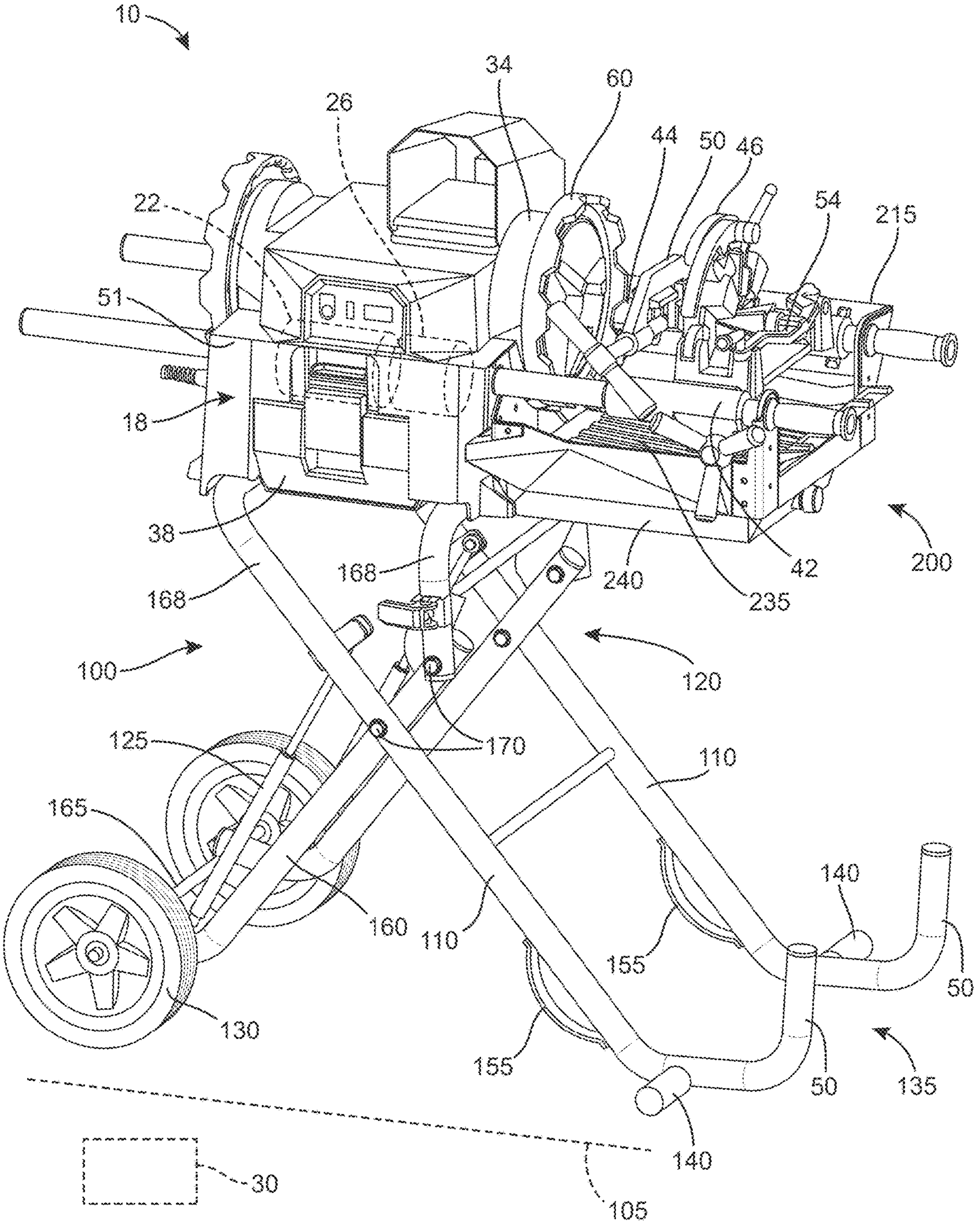
FIG. 1 is a perspective view of a portable pipe threader in accordance with an embodiment of the invention.

With reference to FIG. 1, a portable pipe threader 10 includes a stand 100 and a main housing 51 supported on the stand 100, and a carriage 42 supported on the main housing 51 having a plurality of pipe threading tools 46, 50, 54 supported by the carriage 42. The pipe further includes a drive assembly 18 housed within the main housing 51 and mounted to the stand 100 having a motor 22 (e.g., a brushless direct current electric motor), a gear box 26 coupled to the motor 22 and having a gearbox output 27, an electronic speed selection switch, such as a pedal 30, that selectively controls the drive assembly 18, and a plurality of guide rails 44 configured to support the carriage 42. The drive assembly 18 is powered by a battery pack 38 supported by the stand 100 in selective electrical communication with the motor 22 to provide electrical power to the motor 22. In some constructions, the battery pack 38 and the motor 22 can be configured as an 18 Volt high power battery pack and motor, such as the 18 Volt high power system disclosed in U.S. patent application Ser. No. 16/045,513 filed on Jul. 25, 2018 (now U.S. Patent Application Publication No. 2019/0044110), the entirety of which is incorporated herein by reference. In other constructions, the battery pack 38 and the motor 22 can be configured as an 80 Volt high power battery pack and motor, such as the 80 Volt battery pack and motor disclosed in U.S. patent application Ser. No. 16/025,491 filed on Jul. 2, 2018 (now U.S. Patent Application Publication No. 2019/0006980), the entirety of which is incorporated herein by reference. In such a battery pack 38, the battery cells within the battery pack 38 have a nominal voltage of up to about 80 V. Further, in another embodiment, the battery cells within the battery pack 38 have a nominal voltage of up to about 120 V. In some embodiments, the battery pack 38 has a weight of up to about 6 lb. In some embodiments, each of the battery cells has a diameter of up to 21 mm and a length of up to about 71 mm. In some embodiments, the battery cells within the battery pack 38 are cylindrical battery cells, prismatic battery cells, pouch battery cells, or a combination thereof. In some embodiments, the battery pack 38 includes up to twenty battery cells. In other embodiments, the battery pack 38 includes up to thirty battery cells, up to forty battery cells, up to forty-five battery cells, or greater. In some embodiments, the battery cells are disposed in a single pack. In other embodiments, the battery cells are disposed in multiple packs, i.e., two packs, three packs, four packs, etc. In some embodiments, the battery cells are connected in series. In some embodiments, the battery cells are operable to output a sustained operating discharge current of between about 20 A and about 140 A, for example, about 40 A and about 60 A. In some embodiments, each of the battery cells has a capacity of between about 1.7 Ah and about 15.0 Ah. And, in some embodiments of the motor 22 when used with the 80 Volt battery pack 38, the motor 22 has a power output of at least about 2760 W and a nominal outer diameter (measured at the stator) of up to about 80 mm, up to about 100 mm, up to about 120 mm, up to about 140 mm, or greater.

With reference to FIG. 1, the drive assembly 18 further includes a drive element 34 (e.g., a drive tube) coupled to the gear box 26 and powered by the motor 22. The motor 22 is configured to supply torque to the gear box 26 and rotatably drive the drive element 34 to rotate a pipe (not shown) or a selected one of the plurality of pipe threading tools. The pedal 30 is operable to activate the motor 22 and control a relative speed at which the pipe rotates. In other embodiments, the relative speed at which the pipe rotates can be selected using an electronic speed selection switch other than the pedal 30 (e.g., dial, keypad, button, etc.; not shown).

With continued reference to FIG. 1, the portable pipe threader 10 further includes a spindle 60 in which the pipe is clamped. The drive element 34 interconnects the spindle 60 and the gear box 26. Thus, torque from the motor 22 is transferred to the spindle 60, causing it and the pipe to rotate, via the gear box 26 and the drive element 34. With reference to FIG. 1, the plurality of pipe threading tools 46, 50, 54 includes a die holder 46 having a plurality of dies (not shown) to cut threads on the pipe, a pipe cutter 50 to trim excess pipe, and a pipe reamer 54 to deburr, or otherwise smooth, an inner edge of a cut end of a pipe. The plurality of pipe threading tools 46, 50, 54 remain stationary on the carriage 42 while the pipe is rotated by the spindle 60. The portable pipe threader 10 also includes a lubrication system 200 (FIG. 2) configured to provide lubricant to the pipe during a threading operation using the die holder 46 and a particular die (not shown) installed therein.

Figure 9:
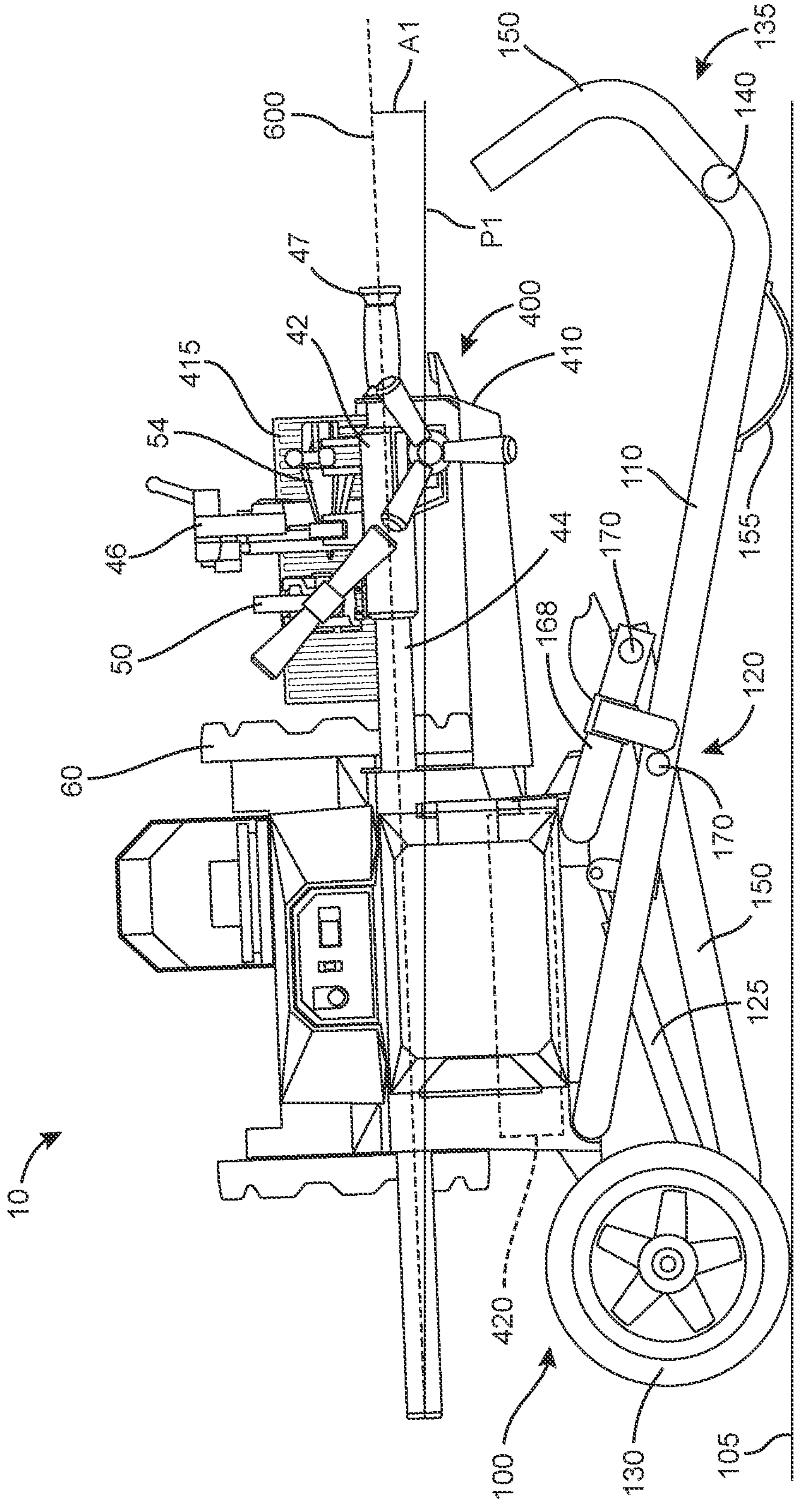
FIG. 9 is a side view of the portable pipe threader of FIG. 1 with a stand in a collapsed state.

With continued reference to FIG. 1, the stand 100 includes an upright portion 168 configured to support the threader 10 and a stand locking mechanism 120 for selectively locking the stand 100 in a deployed state (FIG. 1) and a collapsed state (FIG. 9). The stand 100 further includes a plurality of first and second support legs 110, 160 pivotably coupled via rotatable joints 170 (e.g., bolts, screws, etc.), an axle 165 pivotably coupled to the second support legs 160 having a plurality of wheels 130, a plurality of list-assist springs 125 for aiding the stand 100 from moving from the collapsed state to the deployed state, and a handle assembly 135 integrated with the first support legs 110 having feet portions 140 to support the threader 10 in the deployed state where the threader 10 is elevated from a work surface 105 during use. The handle assembly 135 further includes grip portions 150 for the user to grasp the stand 100 during transport of the threader 10 and loading skis 155 coupled to the first support legs 110 for allowing the stand 100 to travel more easily over difficult surfaces when it is being transported (e.g., being pulled up stairs).

Figure 2:
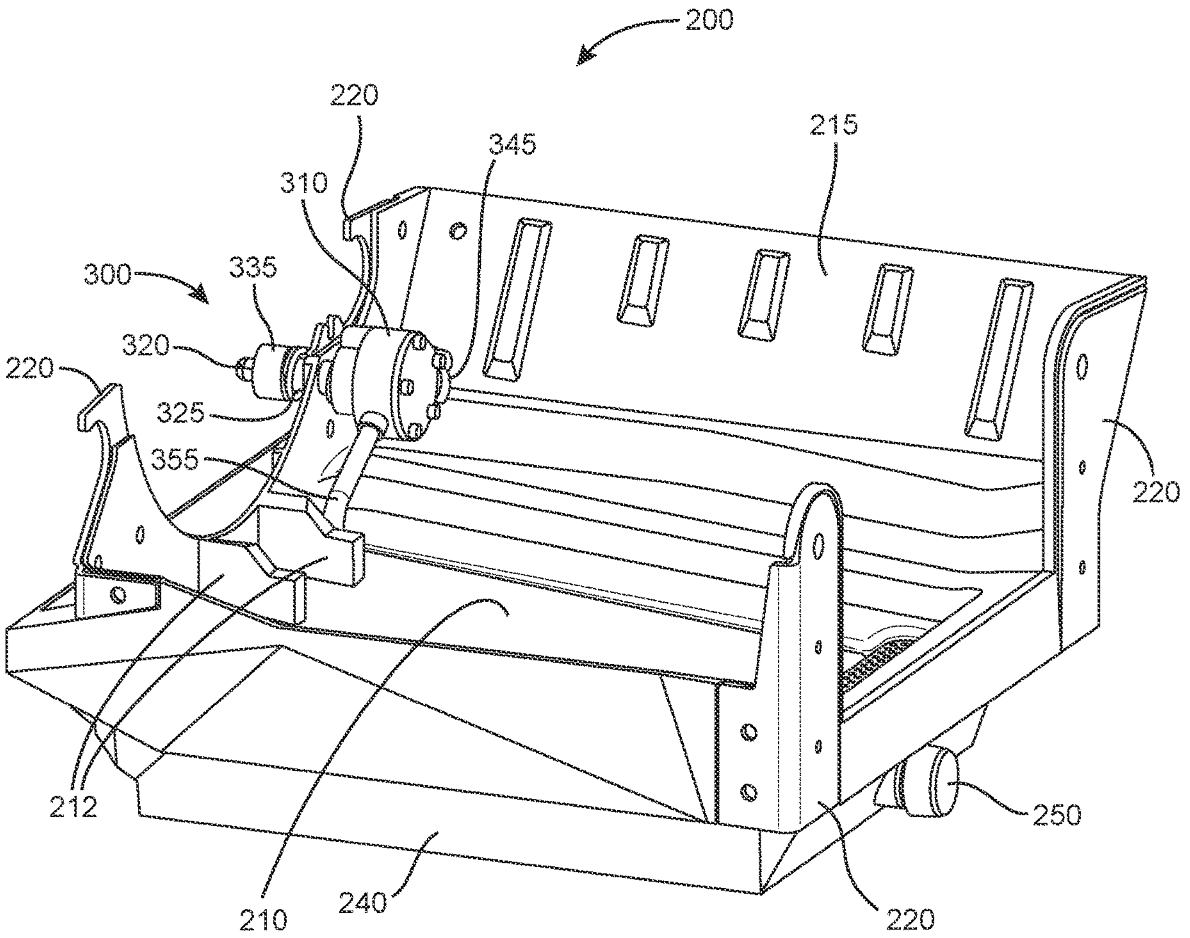
FIG. 2 is a perspective view of an embodiment of a lubrication system for use with the portable pipe threader of FIG. 1.

FIG. 2 illustrates the lubrication system 200 for use with the threader 10. The lubrication system 200 is removably couple to, or engaged with, the housing 51 of the threader 10. As shown, the system 200 includes a catch basin 210 having a shroud 215 for collecting the lubricant that is sprayed from the pipe as it is undergoing work from one of the pipe threading tools 46, 50, 54, a plurality of brackets 220 for selectively mounting the system 200 to the guide rails 44, and a debris shield 235 (FIG. 1) for allowing lubricant to pass into the basin 210 while preventing larger debris (i.e., metal chips) from passing through. The system 200 further includes a reservoir 240 positioned underneath the basin 210 for collecting lubricant, a pump assembly 300 mounted to the basin 210 via a mounting aperture 305 in one of the brackets 220 (FIG. 4), a drain 245 having a drain cap 250 positioned at lower portion of the reservoir 240, and a seal 260 positioned between the basin 210 and the reservoir 240 to seal the basin 210 and the reservoir 240 to prevent leakage. During use of the system 200, the basin 210 is configured to be slightly inclined downward along the guide rails 44 and away from the main housing 51 in order to direct the lubricant away from the pipe and into the reservoir 240.

Figure 3A:
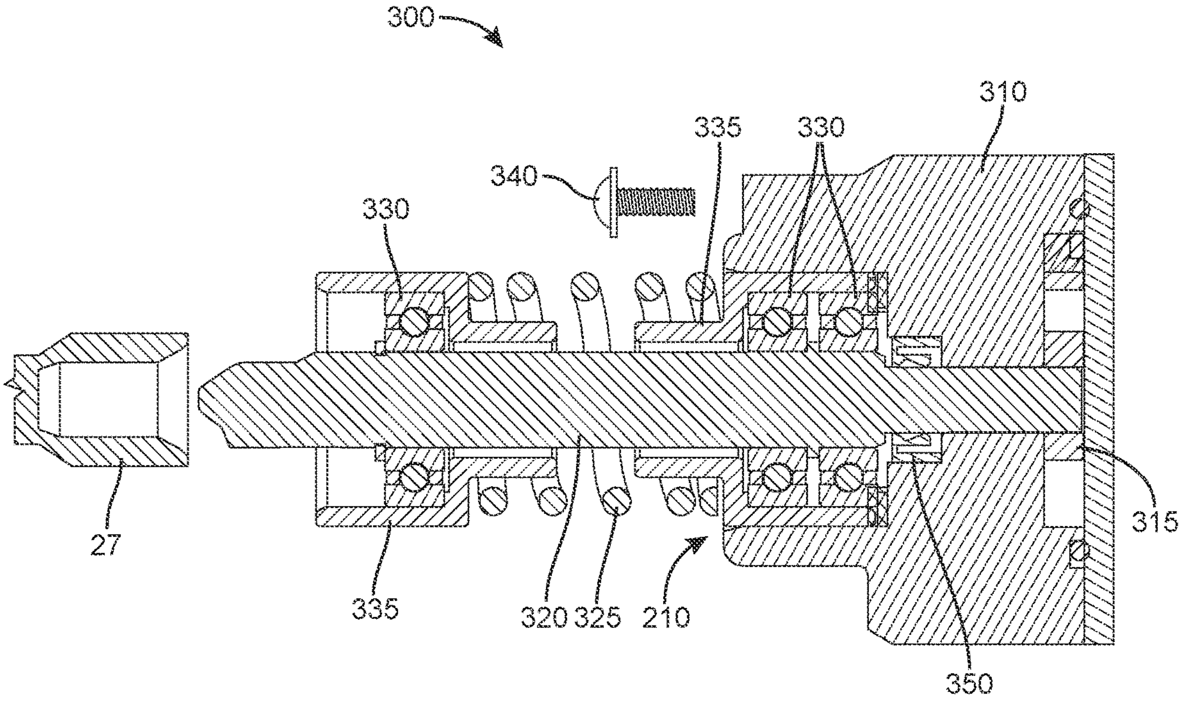
FIG. 3A is a cross-sectional view of a pump assembly for use with the lubrication system of FIG. 2.
Figure 3B:
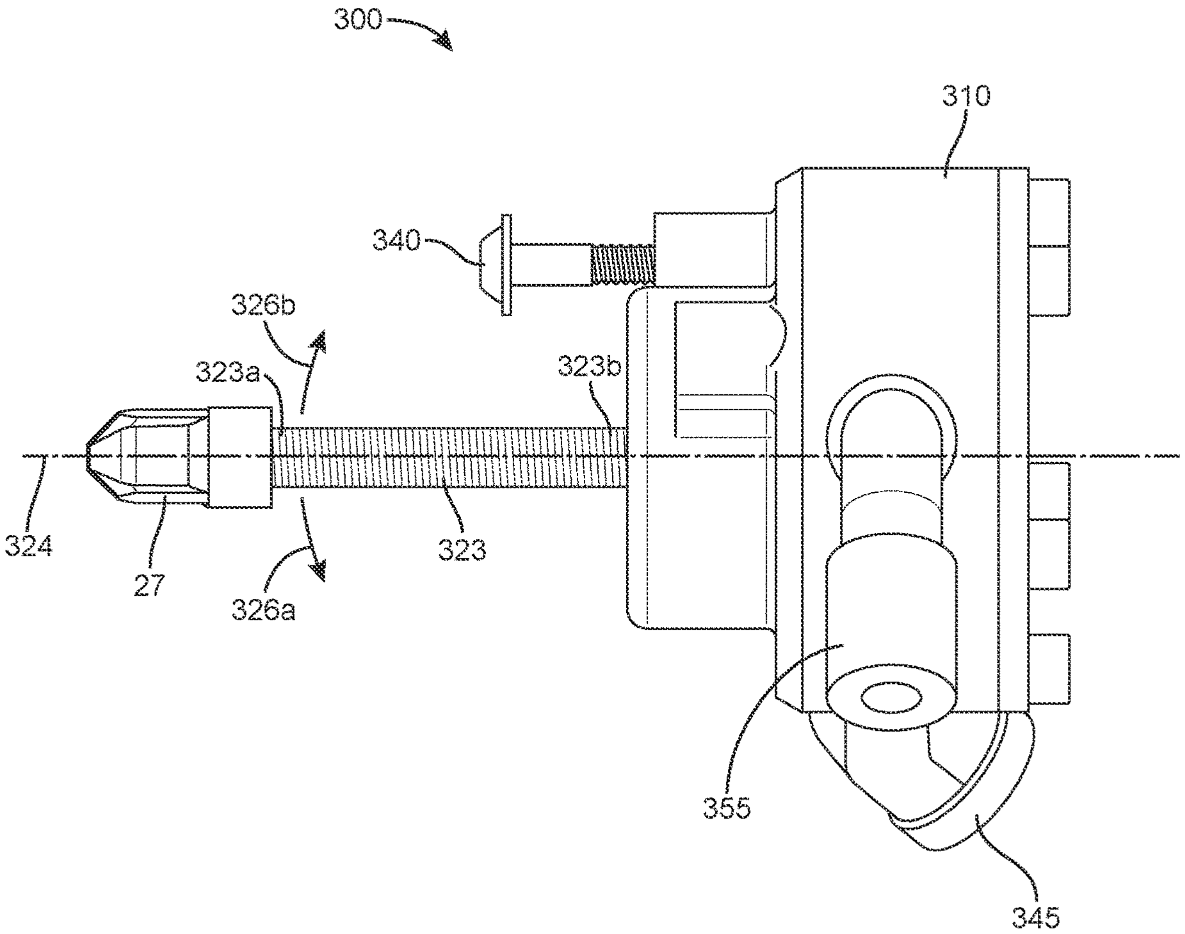
FIG. 3B is a side view of a pump assembly for use with the lubrication system of FIG. 2 in accordance with another embodiment of the invention.
Figure 4:
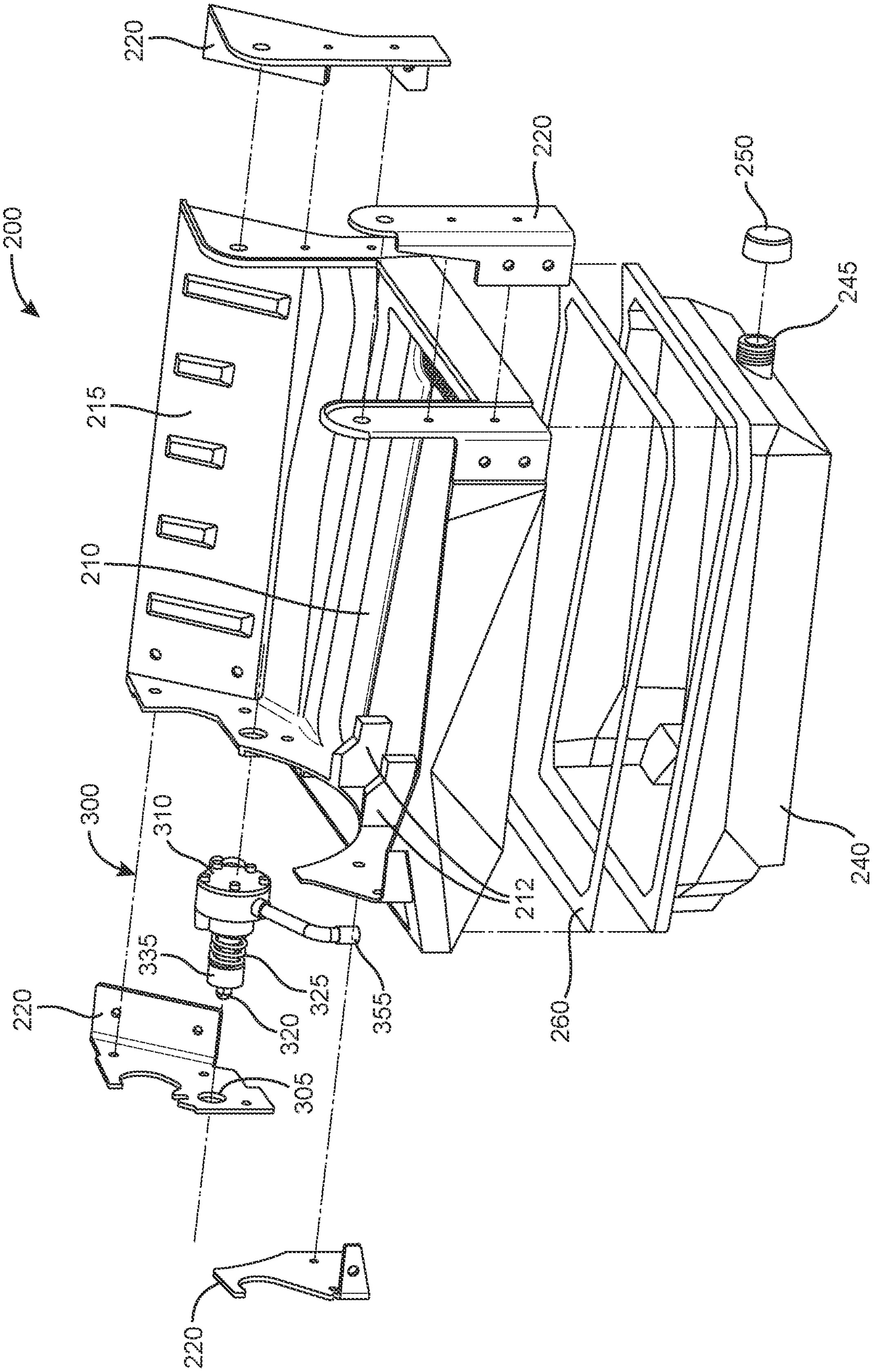
FIG. 4 is an exploded view of the lubrication system of FIG. 2.
Figure 5:
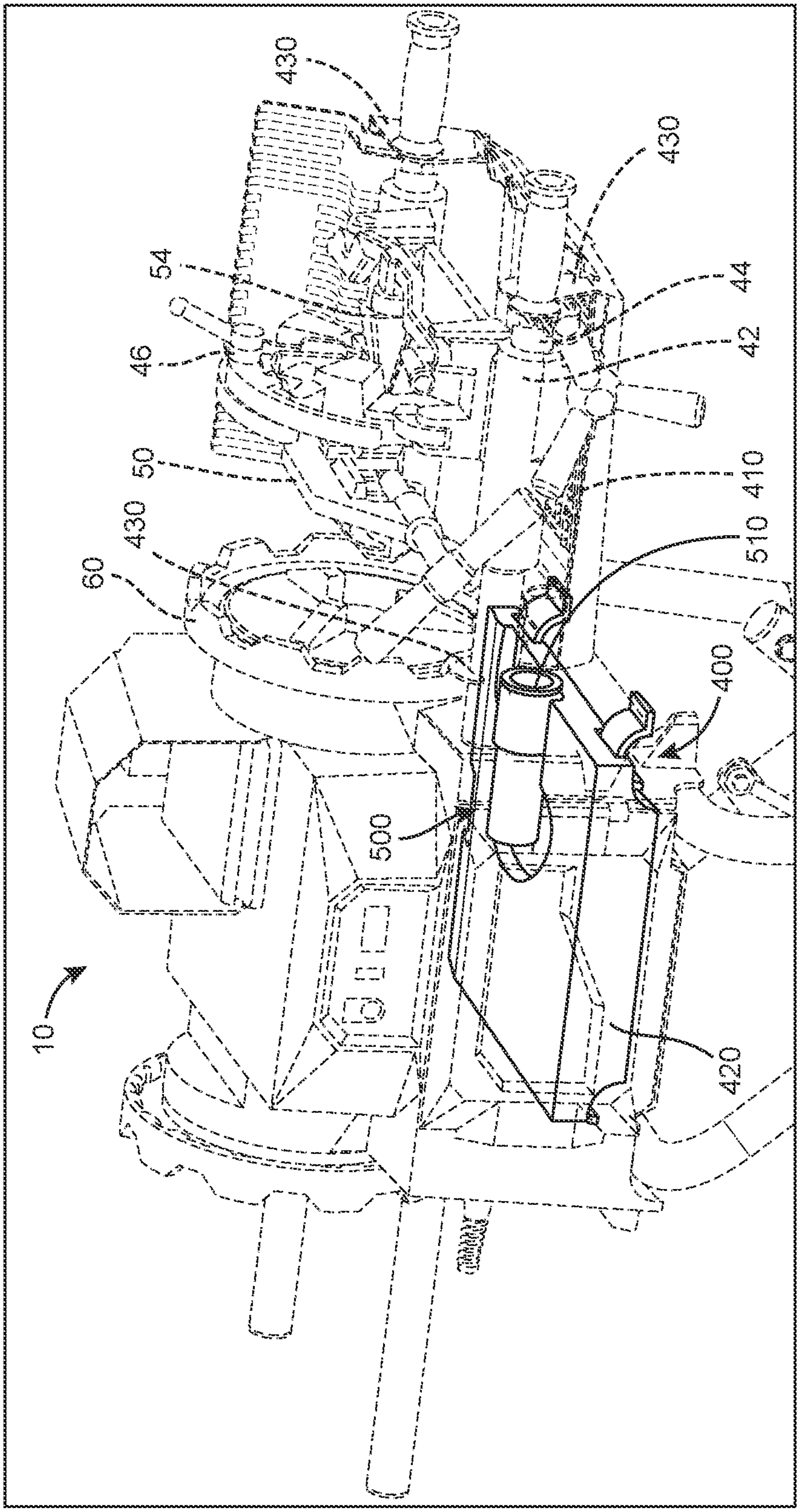
FIG. 5 is a perspective, partial cutaway view of another embodiment of a lubrication system for use with the portable pipe threader of FIG. 1.
Figure 6:
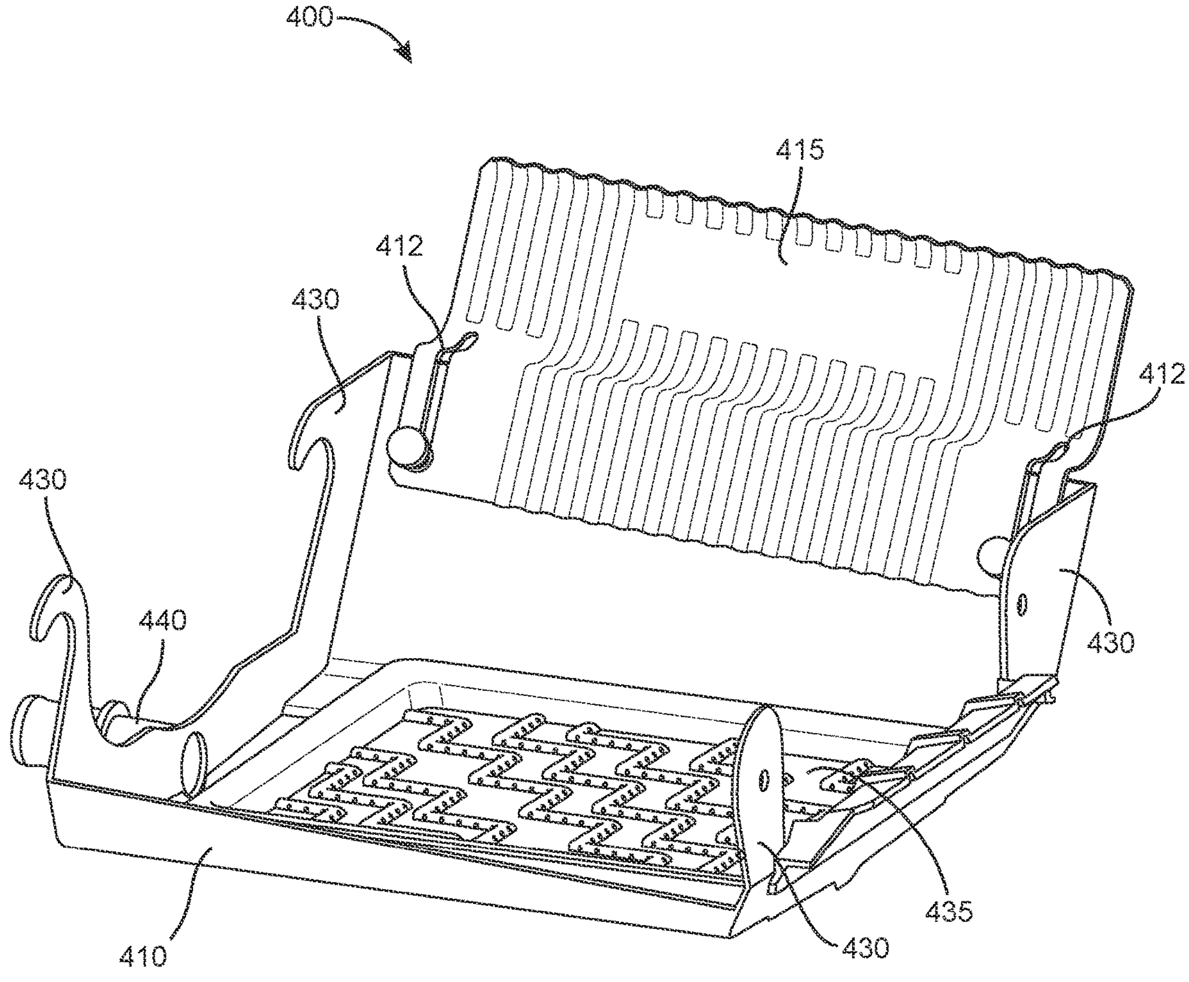
FIG. 6 is a perspective view of a portion of the lubrication system of FIG. 5.
Figure 7:
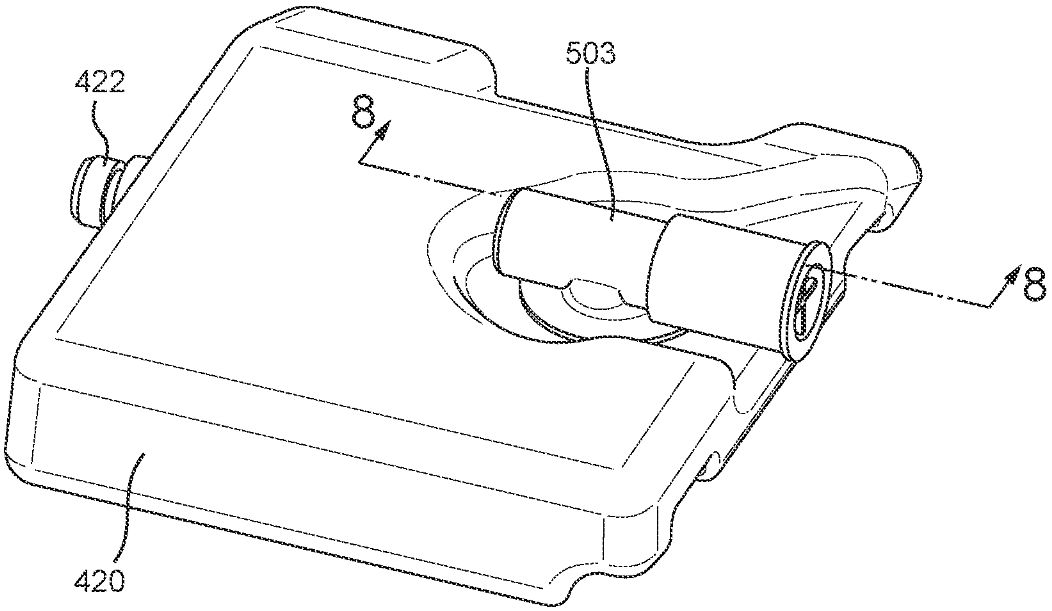
FIG. 7 is a perspective view of a portion of the lubrication system of FIG. 5.
Figure 8:
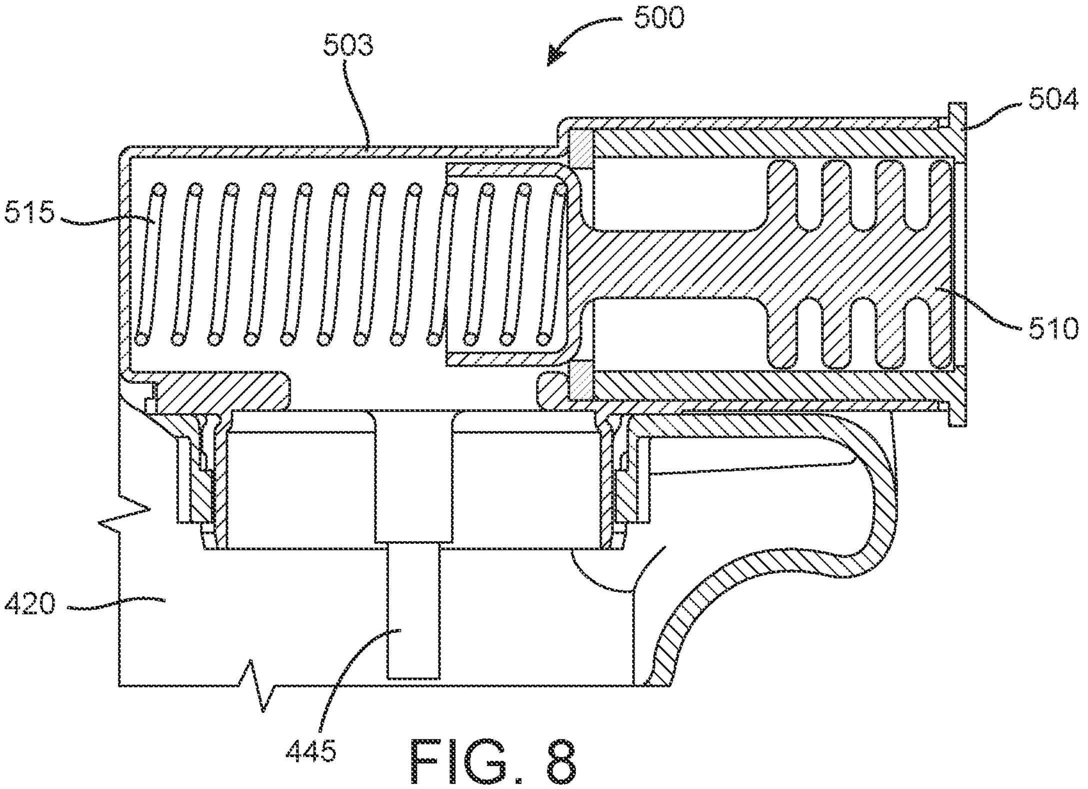
FIG. 8 is a cross-sectional view of a sealing mechanism for use with the lubrication system of FIGS. 5-7.

With reference to FIGS. 2-4, the pump assembly 300 includes a pump housing 310, a pump drive shaft 320 extending from the housing 310, a positioning spring 325 surrounding the drive shaft 320 for guiding the alignment of the shaft 320, a plurality of bearings 330 for supporting the drive shaft 320, and a plurality of bearing cups 335 for housing each of the respective bearings 330. The pump assembly 300 further includes a lip seal 350 positioned between the drive shaft 320 and the housing 310 for sealing the drive shaft 320 with respect to the pump housing 310, a pump intake 355 for drawing lubricant from the reservoir 240, a pump outlet 345 (FIG. 2) for fluidly coupling a hand-held oiling system or an onboard oiling system integrated with the pipe threader 10, and a fastener 340 for limiting the travel freedom of the housing 310 to the basin 210 (via the bracket 220).

When the lubrication system 200 is mounted to the guide rails 44, the positioning spring 325 is configured to facilitate the alignment of the pump drive shaft 320 with the gearbox output 27 (FIG. 3A) for rotatably driving the pump 315. The gearbox output 27 is configured to be selectively rotatably driven in order to let the user cycle between powering just the pump assembly 300, just the threader 10, or both the pump assembly 300 and the threader 10 simultaneously. To further aid in the alignment of the drive shaft 320 with the gearbox output 27, the positioning spring 325 allows the assembly 300 to rotate in any direction within the mounting aperture 305. Furthermore, sufficient clearance exists (e.g., 2 mm) between the mounting aperture 305 and the bearing cup 335 to permit the pump housing 310 to translate in one or more directions relative to the bracket 220 to easily pilot the drive shaft 320 into the gearbox output 27.

FIG. 3B illustrates a flexible guide shaft 323 that can replace the rigid drive shaft 320 in some embodiments of the pump assembly 300. The flexible drive shaft 323 is configured to ensure proper alignment with the gearbox output 27 when the system 300 is mounted to the guide rails 44. Additionally, the flexible drive shaft 323 can reduce the stresses that could be transmitted from the shaft 323 to the pump assembly 300 due to poor alignment with the gearbox output 27. The flexible drive shaft 323 is formed from a wire wound into a helix and this configuration allows the flexible drive shaft 323 to be bendable in all directions, as indicated by arrows 326*a*, 326*b* relative to a center axis 324 of the flexible drive shaft 323 in its relaxed, straight configuration. For example, the free end 323*a* of the flexible drive shaft 323 is bendable up to and including ninety degrees (90°) relative to the fixed end 323*b* of the flexible drive shaft 323 in any direction from the center axis 324.

With continued reference to FIGS. 2-4, the lubrication system 200 is configured to be completely modular, meaning that the entire system 200 is selectively mountable to the guide rails 44 such that when the system 200 is removed, the system 200 becomes a closed system, effectively sealing off both the pump assembly 300 and the gearbox output 27, thereby preventing any oil leak paths from the system 200 or to the gear box 26. Since the system 200 is removable, this gives the user the option to remove the system 200 when the application of lubricant to the pipe is unnecessary. Also, this allows the user to selectively reduce the weight of the threader 10 during transport or when the user is adjusting the threader 10 between the collapsed and deployed states. Additionally, the lubrication system 200 is only operable while the system 200 is mounted to the threader 10 and the drive shaft 320 receives torque from the gearbox output 27, which reduces unnecessary wear on the pump 315 and the gearbox 26.

FIGS. 5-8 illustrate a lubrication system 400 for use with another embodiment of the threader 10. The lubrication system 400 is configured as an integrated system being partially housed within the housing 51 of the threader 10. The system 400 includes a basin 410 having a plurality of mounting brackets 430 for mounting the basin 410 to the guide rails 44, a shroud portion 415 movable relative to the basin 410 along guide grooves 412 for collecting the lubricant that is sprayed from the pipe as it is undergoing work from one of the pipe threading tools 46, 50, 54, and a debris shield 435 (FIG. 6) for collecting larger debris (i.e., metal chips) and preventing such debris from flowing into a drain 440 located at a lower portion of the basin 410.

The lubrication system 400 further includes a valve assembly 500 for fluidly coupling the drain 440 to a reservoir 420 housed within the housing 51 of the threader 10. The valve assembly 500 is also configured to seal the reservoir 420 when the reservoir 420 is removed, or otherwise disengaged, from the basin 410 and removed from the threader 10. The valve assembly 500 includes a housing 503, a valve 510 located within the housing 503, a compression spring 515 for biasing the valve 510 toward a seat defining an inlet 504 to the reservoir 420, and a tube 445 extending into the reservoir 420 for depositing the lubricant flowing from the basin 410 into the reservoir 420. To couple the basin 410 to the reservoir 420, the user mounts the basin 410 onto the guide rails 44 and inserts the drain 440 into the inlet 504, which biases the valve 510 rearward against the bias of the spring 515, thereby allowing lubricant to flow freely between the basin 410 and the reservoir 420. If the user wishes to empty the reservoir 420, the reservoir 420 has an end cap 422 that can be removed to drain the lubricant.

Figure 10:
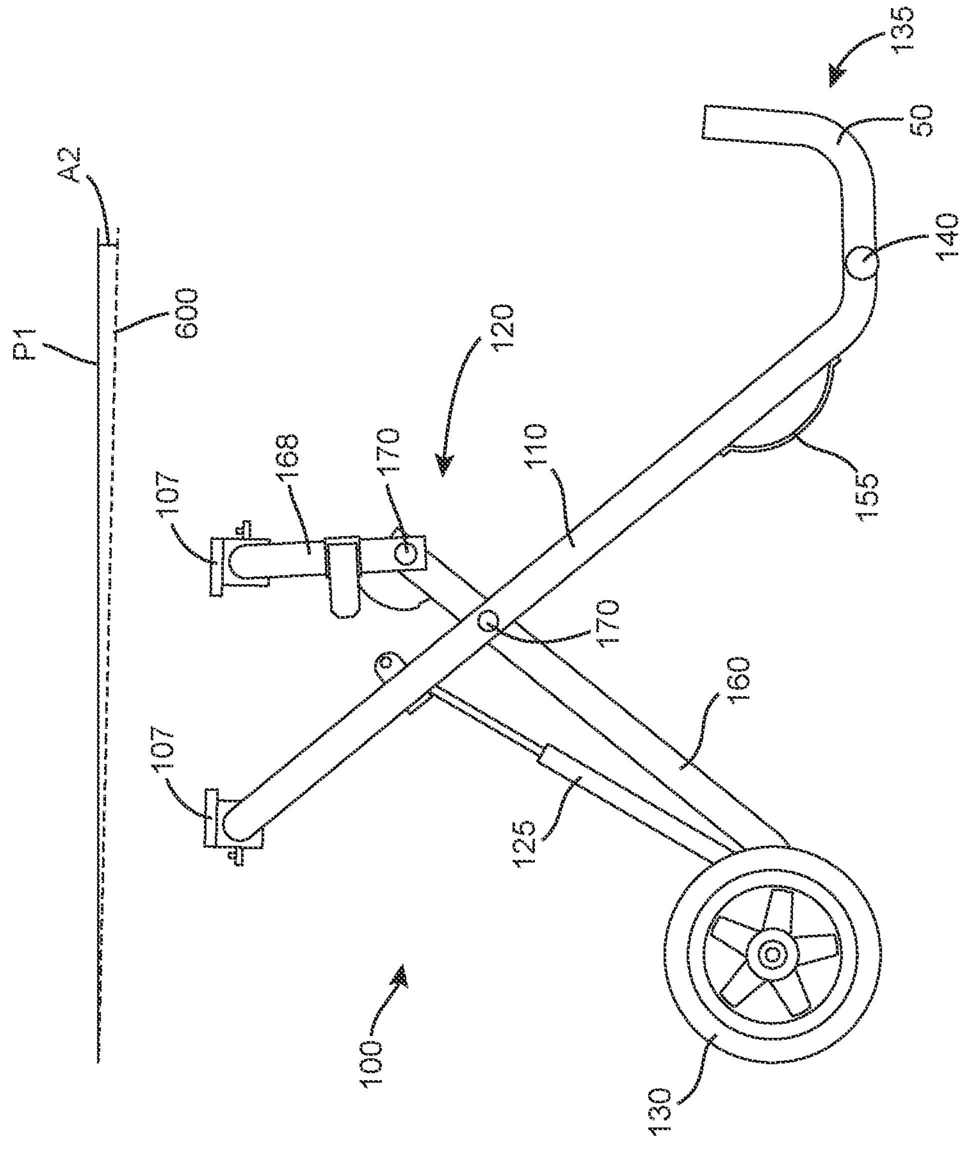
FIG. 10 is a side view of the stand of FIG. 9 in a deployed state.

FIG. 9 illustrates an embodiment of the threader 10 using the integrated lubrication system 400 in the collapsed state where the stand 100 and threader 10 are oriented adjacent the work surface 105. In this state, the threader 10 is supported on the stand 100 via a plurality of brackets 107 (FIG. 10) located on the upright 168 configured to incline the main housing 51 slightly rearward along a spindle axis 600 at a first oblique angle A1 with respect to a reference plane P1, with the pipe threading tools 46, 50, 54 being at a higher elevation than the spindle 60, to promote drainage of the lubricant from the basin 410 into the reservoir 420. In some embodiments, the first oblique angle A1 is between, and including one to two degrees (1°-2°) above a horizontal line. Alternatively, in the deployed state (FIG. 10), the main housing 51 is angled slightly forward along the spindle axis 600 at a second angle A2 with respect to the reference plane P1, with the pipe threading tools 46, 50, 54 being at a lower elevation than the spindle 60, to permit lubricant to flow away from the pipe as work is being performed. In some embodiments, the second oblique angle A2 is between, and including, one to two degrees (1°-2°) below the horizontal reference plane P1.

Although the invention has been described in detail with reference to certain preferred embodiments, variations and modifications exist within the scope and spirit of one or more independent aspects of the invention as described.

Various features of the invention are set forth in the following claims.

What is claimed is:

1. A portable pipe threader comprising:

a housing;

a plurality of guide rails coupled to the housing;

a carriage supported by the plurality of guide rails;

at least one pipe threading tool coupled to the carriage and selectively operable to perform work on a pipe;

a drive assembly at least partially positioned within the housing, the drive assembly including an electric motor operable to provide torque to the pipe; and a lubrication system including a reservoir for holding a lubricant, a basin, which the reservoir is positioned underneath, and a pump supported upon the reservoir and configured to draw the lubricant from the reservoir, the pump being powered by the drive assembly, wherein the lubrication system is removably coupled to the plurality of guide rails, wherein the lubrication system further includes a plurality of brackets configured to selectively couple the lubrication system to the plurality of guide rails, and wherein the pump is mounted to the basin via one of the plurality of brackets.

2. The portable pipe threader of claim 1, further comprising:

a battery pack configured to provide electrical power to the motor.

3. The portable pipe threader of claim 2, wherein the motor is a brushless direct current electric motor.

4. The portable pipe threader of claim 1, wherein the pump is only powered by the drive assembly when the lubrication system is coupled to the plurality of guide rails.

5. The portable pipe threader of claim 1, wherein the pump further comprises a pump drive shaft configured to receive torque from the drive assembly; and a positioning spring surrounding the pump drive shaft for guiding the alignment of the pump drive shaft with the drive assembly when the lubrication system is mounted onto the plurality of guide rails.

6. The portable pipe threader of claim 5, wherein the pump drive shaft is a flexible drive shaft.

7. The portable pipe threader of claim 6, wherein the flexible drive shaft comprises a wire wound into a helix.

8. The portable pipe threader of claim 6, wherein the flexible drive shaft is bendable in all directions relative to a center axis of the flexible drive shaft.

9. The portable pipe threader of claim 8, wherein a free end of the flexible drive shaft is bendable up to ninety degrees (90°) relative to a fixed end of the flexible drive shaft.

10. The portable pipe threader of claim 5, further comprising a gearbox output configured to be aligned with the pump drive shaft by the positioning spring for driving the pump.

11. The portable pipe threader of claim 10, wherein the gearbox output is configured to be selectively rotatable by the drive assembly to cycle between just powering the pump, just powering the portable pipe threader, or powering the pump and the portable pipe threader simultaneously.

12. The portable pipe threader of claim 5, wherein the positioning spring allows the pump to rotate in any direction.

13. The portable pipe threader of claim 5, wherein the pump further comprises a pump housing through which the pump drive shaft extends.

14. The portable pipe threader of claim 13, wherein the pump further comprises a seal positioned between the pump drive shaft and the pump housing.

15. The portable pipe threader of claim 13, further comprising a fastener configured to limit a travel freedom of the pump housing to the basin of the lubrication system.

16. The portable pipe threader of claim 5, wherein the pump further comprises a plurality of bearings for supporting the pump drive shaft; and a plurality of bearing cups configured to house each of the plurality of bearings.

17. The portable pipe threader of claim 5, wherein the pump further comprises a pump intake configured to draw lubricant from the reservoir; and a pump outlet configured to fluidly couple an oiling system with the portable pipe threader.

18. The portable pipe threader of claim 17, wherein the oil system is a hand-held oiling system.

19. The portable pipe threader of claim 17, wherein the oil system is an onboard oiling system.

* * * * *